United States Patent [19]

Buffat et al.

[11] Patent Number: 5,443,862

[45] Date of Patent: Aug. 22, 1995

[54] PROCESS FOR THE TREATMENT OF THIN FILMS HAVING PROPERTIES OF ELECTRICAL CONDUCTION AND/OR REFLECTION IN THE INFRARED

[75] Inventors: Bernard Buffat, Paris; Danièle Pillias, Aulnay sous Bois; François Lerbet, Paris, all of France

[73] Assignee: Saint-Gobain Vitrage International, Courbevoie, France

[21] Appl. No.: 112,979

[22] Filed: Aug. 30, 1993

[30] Foreign Application Priority Data

Aug. 28, 1992 [FR] France .................. 92 10388

[51] Int. Cl.$^6$ .................. B05D 3/06; B05D 5/12
[52] U.S. Cl. .................. 427/526; 427/529; 427/533; 427/102; 427/126.3
[58] Field of Search .................. 427/526, 529, 523, 101, 427/102, 103, 126.3, 533, 539, 535, 255.1, 255.3; 204/192.25

[56] References Cited

U.S. PATENT DOCUMENTS

| | | |
|---|---|---|
| 3,887,349 | 6/1975 | Akashi et al. . |
| 3,907,660 | 9/1975 | Gillery . |
| 4,088,799 | 5/1978 | Kurtin .................. 427/526 |
| 4,102,768 | 7/1978 | Kearin et al. . |
| 4,116,806 | 9/1978 | Love et al. . |
| 4,166,018 | 8/1979 | Chapin . |
| 4,172,159 | 10/1979 | Marcault . |
| 4,395,467 | 7/1983 | Vossen, Jr. et al. .................. 427/529 |
| 4,500,567 | 2/1985 | Kato et al. . |
| 4,686,162 | 8/1987 | Stangl et al. .................. 427/526 |
| 4,694,091 | 9/1987 | Kerherve et al. . |
| 4,707,383 | 11/1987 | Mattes et al. . |
| 4,859,499 | 8/1989 | Sauvinet et al. . |
| 4,873,118 | 10/1989 | Elias et al. .................. 427/539 |
| 4,888,202 | 12/1989 | Murakami et al. .................. 427/529 |
| 5,011,580 | 4/1991 | Brochot et al. .................. 204/192.13 |
| 5,087,322 | 2/1992 | Lillienfeld et al. .................. 427/526 |

FOREIGN PATENT DOCUMENTS

| | | |
|---|---|---|
| 0027403 | 4/1981 | European Pat. Off. . |
| 0350362 | 1/1990 | European Pat. Off. . |
| 0385769 | 9/1990 | European Pat. Off. . |
| 0397292 | 11/1990 | European Pat. Off. . |
| 2208005 | 6/1974 | France . |
| 2584392 | 2/1992 | France . |
| 1909869 | 9/1969 | Germany . |
| 55-011127 | 1/1980 | Japan .................. 427/529 |
| 56-014498 | 2/1981 | Japan .................. 427/529 |
| 60-211924 | 10/1985 | Japan .................. 427/529 |
| 61-246361 | 11/1986 | Japan .................. 427/529 |
| 03017252 | 1/1991 | Japan .................. 427/529 |
| 1446849 | 8/1976 | United Kingdom . |

OTHER PUBLICATIONS

Translation of Japanese reference 61-246,361 & Toray, Ind. Inc. pub. Nov. 1, 1986.

Thin Solid Films, vol. 11, 1972, pp. 1-26, P. T. Stroud, "Ion Bombardment and Implantation and Their Application to Thin Films" No month.

Materials Research Society Symposium Proceedings, vol. 27, 1984, pp. 765-770, "Recoil Implantation of Ito Thin Films on Glass Substrates", B. H. Rabin, et al. No month.

Bonding sheet materials together—by bringing sheets into composite assembly and heating to temp, such that one of sheets adheres to the adjacent sheet, Derwent, English language abstract of EP-385769 A No date given.

(List continued on next page.)

Primary Examiner—Marianne Padgett
Attorney, Agent, or Firm—Oblon, Spivak, McClelland, Maier, & Neustadt

[57] ABSTRACT

A method is provided for generating one or more differentiated zones of electrical conductivity or infrared emissivity in a thin semi-conducting layer of metallic oxide or oxides, comprising:

subjecting the thin semi-conducting layer to an ion beam having sufficient energy to cause a change in electrical conductivity or infrared emissivity of the one or more zones without atomizing the thin semi-conducting layer, wherein the thin semi-conducting layer is at a high temperature during the subjecting step and the use of the method to prepare films for incorporation into transparent heating panes having uniform heating characteristics, especially for use in vehicles.

8 Claims, No Drawings

OTHER PUBLICATIONS

Metal oxide film deposn on glass strip—by pyrolytic decompsn of spryaed-on metal cpds, Derwent English language abstract of FR2211411, U.S. equivalent 3,887,349, is attached No date.

Deposition of tin oxide on substrates—using butyl tin tri:chloride as source, with dopant, Derwent, English language abstract of EP-121459, U.S. equivalent 4,500,567, is attached No date.

Electrically conducting films formed on glass substrates by CVD—where gaseous organofluoro cpd. added to metal vapour produces films with very low resistivity, Derwent, English language abstract of EP-27403 French No date given.

Infrared relecting coating of doped tin oxide for glass- —obtd. by pyrolysis or organic tin and halogen cpds., esp. organic tin:flourine cpds., English language abstract of EP-39256, U.S. equivalent 4,707,383, is attached No date.

Prepn. of di:butyl tin di:fluoride—by reacting a tin halide cpd. with ammonium fluoride in absence of alkali(ne earth) metal cpds., Derwent, English language abstract of EP-178956, U.S. equivalent 4,694,091, attached No date.

Semi-reflecting glass pane reducing transmission of infrared rays where pane has inexpensive coating of tin oxide (BE 16.8.78), Derwent, English language abstract of FR2380997, U.S. equivalent 4,172,159, is attached No date.

Prodn. of thin transparent conducting metal oxide films on glass—by pyrolysis of powdered indium formate and tin cpds. then heat treatment in reactive atoms., Derwent, English language abstract of EP 397292 French No date.

Cathodic sputtering appts.—using electromagnet to provide curved magnetic field in discharge region, Derwent, English Abstract of DE2463431, U.S. equivalent 4,166,018 attached No dates given.

Depositing metallic oxide coatings—partic transparent electrically conductive coatings on non-conductive substrates, Derwent, English language abstract of FR2208005, U.S. equivalent 4,102,768, is attached Kerin et al No date given.

PROCESS FOR THE TREATMENT OF THIN FILMS HAVING PROPERTIES OF ELECTRICAL CONDUCTION AND/OR REFLECTION IN THE INFRARED

BACKGROUND OF THE INVENTION

1. Field of the Invention:

The present invention refers to a process for the treatment of thin films which have properties of electrical conduction and/or of reflection in the infrared, especially of low emissivity, in order to locally modify these properties in a selective manner.

2. Discussion of the Background

Conventional methods for defrosting or demisting of heated glass panes rely on controlled heating, by the Joule effect, of a conducting thin film deposited on a substrate of the pane. The heating is performed by subjected the film to an electrical potential by means of electrical supply leads, generally connected to the film at two of its opposite sides.

Unfortunately, once such a heated glass pane is given a relatively complex geometry, such as a non-rectangular contour and/or a more or less pronounced curvature, it is no longer possible to obtain a uniform heating of the entire area of the pane when the conducting film has substantially constant electrical characteristics at each point. Since these complex geometries occur in the majority of the panes with which automobiles or aircraft are equipped, such as the windscreen or windshield, it is of the utmost importance to guarantee a maximum field of view through the panes for obvious reasons of safety, whatever the climatic conditions.

In order to obtain uniform heating, it is thus necessary to provide zones in the film which have a modified electrical conductivity or, as is frequently done in the field of heated glass panes (or heating panes), a modified resistance per unit area.

However, the solutions applied to date for producing a conductive film having differentiated zones of conductivity or resistance per unit area do not give complete satisfaction.

In French Patent Application FR-A-2 208 005, a process is proposed for the treatment of a conducting film deposited by cathodic sputtering, which enables the thickness of the film to be modified locally during the sputtering operation itself, by varying the number of masks used. The local reduction in thickness in the zones in which the masks are used leads to a controlled increase in the square resistance. (The square resistance $R_\square$ is equal to the quotient of the resistivity $\rho$ divided by the thickness $e$: $R_\square = \rho/e$). The main disadvantage of this technique is that it is often necessary to create zones having square resistances very much higher than the initial resistance of the film. This requires considerable variations of thickness in the film, variations that lead to an overall inhomogeneous and annoying appearance of the pane, especially when viewed in reflection.

French Patent FR-2 584 392 discloses a method consisting of subjecting the conducting oxide film, after Ti has been deposited, to a very intense and rapid heating in an oxidizing or reducing atmosphere.

This treatment has the effect of decreasing (with an oxidizing atmosphere) or increasing (with a reducing atmosphere) the resistivity of the film, without modifying its thickness. This technique, which generally employs burners, may utilize a heating differentiated from one zone to another of the film for the purpose of obtaining different conductivities. It does, however, appear to be better adapted as an after-treatment following film deposition by pyrolysis onto a continuous band of glass, rather than for use following film deposition by a process using vacuum, such as cathodic sputtering.

Thus, a method is needed for preparing a heating pane having differentiated zones of electrical conductivity which preserves the visual appearance of the pane and is applicable regardless of the mode of productivity of the semiconducting film.

SUMMARY OF THE INVENTION

Accordingly, one object of the present invention is to provide a method for generating one or more differentiated zones of electrical conductivity or infrared emissivity in a thin semi-conducting layer of metallic oxide or oxides.

A further object of the present invention is to provide a method for preparing a heating pane having differentiated zones of electrical conductivity in a thin semiconducting of metallic oxide or oxides which is reliable and accurate, applicable whatever the mode of production of the film and which preserves the homogeneity of the visual appearance of the pane comprising such a film.

Another object of the present invention is to provide a heating pane having differentiated zones of electrical conductivity in a thin semiconducting of metallic oxide or oxides while maintaining a high homogeneity of the visualk appearance of the pane and which heats uniformly regardless of geometry.

These and other objects of the present invention have been satisfied by the discovery of a method for generating one or more differentiated zones of electrical conductivity or infrared emissivity in a thin semi-conducting layer of metallic oxide or oxides, comprising:

subjecting the thin semi-conducting layer to an ion beam having sufficient energy to cause a change in electrical conductivity or infrared emissivity of the zones without atomizing the thin semi-conducting layer, wherein the thin semi-conducting layer is at a high temperature during the step of subjecting the layer to the ion beam, and the use of this process to prepare the modified thin semi-conducting layers and their use in providing transparent heating panes which heat uniformly and have a high homogeneity of visual appearance.

DETAILED DESCRIPTION OF THE PREFERRED EMBODIMENTS

The present invention relates to a method for generating one or more differentiated zones of electrical conductivity or infrared emissivity in a thin semi-conducting layer of metallic oxide or oxides, comprising:

subjecting the thin semi-conducting layer to an ion beam having sufficient energy to cause a change in electrical conductivity or infrared emissivity of the one or more zones without atomizing the thin semi-conducting layer, wherein the thin semi-conducting layer is at a high temperature during the subjecting step and the use of the method to prepare films for incorporation into transparent heating panes for use in vehicles which have uniform heating characteristics.

Within the context of the present invention, the expression "low energy ion beam" is to be understood as meaning a beam of ions, having sufficient energy to cause variations in the electrical conductivity (or resistivity) of the thin film without causing the atomization of the film in the zones subjected to the beam under the impact of the ions.

The low energy ion beam may be either oxidizing or reducing in nature. In an oxidizing ion beam, at least a portion of the ions of the beam are of an oxidizing nature, such as ions based upon ionized oxygen. These oxidizing ions have the effect of locally reducing the electrical conductivity of the film in the zones subjected to the beam.

Alternately, when a reducing ion beam is used, at least a portion of the ions of the beam are of a reducing nature, such as ions based upon ionized hydrogen. These reducing ions have the effect of locally increasing the electrical conductivity of the zones subjected to the beam.

The method of the present invention has many advantages. First, the present method of treatment is totally separated from the process of film deposition, which allows the use of any conventional film deposition techniques, even those that use vacuum or those of the pyrolysis type. Second, the zones to be treated can be localized by focussing the beam in a desired area and intensity while maintaining complete control of the modulation of the beam intensity and location. Third, the present method does not modify the thickness of the zones of the film that are subjected to the beam. Thus, it is possible to guarantee a pane having a homogeneous visual appearance equal to that of a pane having an untreated film, regardless of the magnitude of the present treatment.

The present method can be readily adapted to any type of semiconducting metallic oxide film, regardless of its electrical conductivity after deposition, since the method affords the choice of locally increasing or decreasing the conductivity of the desired zones, relative to the surrounding film. (It will be remembered that conductivity is the inverse of resistivity).

The present inventors have thus discovered the particularly surprising effect upon the film resistivity of the combined use of an ion beam and a heating operation, although until now ion beams had been used for very different objectives.

The effect of using ions beams in techniques of the type known as "ion-assisted deposition (IAD)" is known. These IAD techniques are those in which a beam, especially of oxygen ions, is aimed at the film, during its deposition by evaporation or ion sputtering, and causes a densification of the metallic oxide film thus formed. This densification, which in general can be measured by an increase in refractive index, enables the chemical and/or physical durability of the film to be increased.

The present method is believed to operate under quite a different mechanism. It is believed that a restructuring of the oxide or oxides lattice takes place under the effect of the ions of the beam at the surface of the film, with the restructuring able to propagate through a non-negligible thickness of the film. This restriction is thought to lead to modifying the concentration of oxygen vacancies in the lattice, a modification which would directly influence the electrical conductivity, since it is these vacancies that for the most part give the electrical properties to the oxide. Thus, oxidizing ions, by reducing this concentration, have been found to reduce the conductivity, while reducing ions have been found to produce the opposite effect.

This phenomenon has been found to be all the more astonishing when care is taken to choose a low energy ion beam in order to avoid atomizing the zones of the film treated by the beam. Such atomization would cause local reductions in thickness, which is one problem of the prior art methods which the present method is addressing.

The present invention has shown that when the film is raised to a high temperature the ions of the beam cause modifications in the oxide lattice that are sufficiently large to induce considerable variations in conductivity, as already mentioned, and without causing atomization.

The process according to the present invention is very flexible in use and can be readily adapted to different installations and to the use of different types of conventional ion guns creating the beam. In fact it is possible to obtain the desired variation of conductivity by jointly or separately modulating various parameters, such as the temperature of the film to be treated, the duration of the treatment by ion beam, or the energy of the ions of the beam at impact on the film.

It is preferred that the temperature of the film be at least approximately 150° C., and below the melting temperature of the film or pane, more preferably about 250° C.

Since certain deposition techniques require the substrate on which the film is deposited to be heated to temperatures exceeding 150° C., the ion beam treatment can then be carried out immediately following deposition of the film without the need for an additional heating step. The duration of the treatment in a particular zone should be chosen in such a way as to remain compatible with the industrial requirements for mass production, and is preferably less than 60 minutes, more preferably less than 30 minutes.

The energy of the ions can be regulated in a variety of ways in order to obtain the desired effect without atomization.

The feature that is, in effect, important to choose and control is not so much the energy of the beam at the emission source, or the ion gun, but the energy with which the ions strike the film. This striking energy must be chosen to be of "low value", preferably less than 100 electron volts and more preferably between 50 and 90 electron volts. Regulation of the beam energy may be accomplished in a variety of ways. For example, it is possible to regulate this energy at the level of the film by modulating the energy of the beam at the emission source and the distance between emission source and film, with the film not being subjected to voltage. It is also possible to polarize the film during the treatment, which then allows ion beams to be used which are clearly of higher energy at the source than in the preceding case. In fact, the polarization of the film has the effect of "retarding" the approach of the ions to the film, and can be adjusted so that they strike the film with the same energy as when the film is not polarized.

The ion density of the beam should also be chosen to be in the range of from 0.1 to 1.0 milliampere per square centimeter ($mA/cm_2$), preferably 0.1 to 0.5 $mA/cm^2$.

The process according to the present invention can be applied to any type of substoichiometric metallic oxide or oxides, and/or those which are doped, by insertion of a certain percentage of another metal into the lattice of the oxide of the given metal. Preferably, the process is applied to films of indium oxide doped with tin (ITO), tin oxide doped with fluorine ($SnO_2$:F), and zinc oxide doped with indium (ZnO:In), with aluminum (ZnO:Al), with tin (ZnO:Sn) or with fluorine (ZnO:F).

These semiconducting films can be prepared by conventional methods such as vacuum deposition and cathodic sputtering which are well known and enable the optical and electrical performances of the films obtained to be well controlled. In particular, those techniques are known which are carried out in the presence of a magnetic field, which increases the mobility of the electrons and therefore the probability of ionization and, consequently, the sputtering rate of the target. Such methods are disclosed in German Patent DE-24 63 431 C2, which proposes such a process using a planar magnetron, and U.S. Pat. No. 4,116,806 which uses a target in the form of a belt, as "belt track".

Likewise, reactive cathodic sputtering techniques are known, which enable a thin film to be produced by causing the material of the target to react with a gas of the plasma, such as disclosed in U.S. Pat. No. 3,907,660 which puts forward such a process for the deposition of metallic oxide onto glass.

It is also possible to use the techniques known as pyrolysis, consisting of projecting, in a liquid, solid or gaseous phase, organometallic precursors onto a substrate raised to high temperature so that they decompose into the desired oxides.

Thus, for obtaining a conducting film of ITO by pyrolysis, a powder mixture of indium formate and dibutyl tin oxide may be used, as described in European Patent EP-B-397 292.

If the conducting film is of $SnO_2$:F, it may be produced by pyrolysis of powder from dibutyl tin oxide (DBTO) in powder form and gaseous anhydrous hydrogen fluorine, as described in French Patent FR-2 380 997, or from dibutyl tin difluoride (DBTF) possibly in a mixture with DBTO as described in EP-A-178 956 and EP-A-039 256.

The film may also be obtained by gaseous phase pyrolysis, such as from a mixture of tin compounds such as $(CH_3)_2 SnCl_2$, $(C_4H_9)_2 SnCl_2$, $Sn(C_2H_3)_4$, and of organofluorinated compounds such as $CCl_2F_2$, $CHClF_2$ and $CH_3CHF_2$, as described in EP-A-027 403, or again from monobutyl tin trichloride and a compound of the formula $CX_2F_2$, where X may be a halogen and/or a hydrogen, such as chlorodifluoromethane mentioned in EP-A-121 459.

The film may also be obtained by liquid phase pyrolysis from tin acetyl-acetonate or dimethyl tin-2-propionate in suitable organic solvents, such as described in FR-2 211 411.

Films of ZnO:In or of ZnO:Al can be produced by vapor phase pyrolysis, from diethyl zinc or zinc diacetate and triethyl indium, indium chloride or triethyl aluminum, aluminum chloride, as described in EP-A-385 769.

The process according to the present invention is therefore very effective and adaptable and can be applied successfully to a variety of films such as those for use in panes for aircraft, which generally comprises three substrates.

In such a use, the films intended for defrosting and treated according to the present invention are preferably disposed on the outer face of the substrate with the films intended more specifically for demisting being situated on the inner substrates.

To obtain the necessary resistance gradients, which are frequently relatively complex in view of the geometry of these panes, the ion gun can be readily mounted on an automated movable arm, and moved during the treatment facing the film to be treated.

Having generally described this invention, a further understanding can be obtained by reference to certain specific examples which are provided herein for purposes of illustration only and are not intended to be limiting unless otherwise specified.

EXAMPLES

All the examples relate to the treatment of a thin conducting film based upon ITO on a substrate of clear silico-sodo-calcic glass of 3 millimeters thickness, deposited by cathodic sputtering assisted by a magnetic field, according to the following parameters: the target was composed of a mixture of indium oxide and approximately 9 mol % of tin oxide. The vertical cathode had a length of 380 mm and a width of 120 mm. The glass substrate had dimensions $30 \times 30$ cm$^2$ and was vertical and movable. The glass moved in front of the cathode at a speed of 2 cm/min, and the power applied was 0.55 watt/cm2. The carrier gas was argon with the pressure of the enclosure being $8 \times 10^{-3}$ torr (or approximately 1.1 Pa). The glass passed before the cathode a sufficient number of times for a film of approximately 135 nanometers thickness to be deposited.

The table below summarizes the characteristics of the film obtained, with $R_\square$ being the square resistance in Ohms per square centimeter of the film measured by the 4-point method, $\rho$ being its resistivity expressed in Ohm.cm, and n being its refractive index. Also provided are the optical characteristics in reflection on the film side of the thus coated substrate: with $R_L$ being the light reflection in percent, $\lambda_{dom}$ being the dominant wavelength in nanometers and $P_e$ is the excitation purity in percent. The combination of $\lambda_{dom}$ and $P_e$ enables the residual color and its intensity in reflection to be determined in the locus spectrum.

TABLE I

|  | IT FILM |
| --- | --- |
| n | 2 |
| $R_\square$ | 19.4 |
| $\rho$ | $2.6 \times 10^{-4}$ |
| $R_L$ | 9.9 |
| $\lambda_{dom}$ | −562 |
| $P_e$ | 23 |

Starting from a film of ITO, which may be considered to have a high electrical conductivity, it was desired to create localized zones in which the conductivity was lower.

Example 1

The ITO film, the characteristics of which are set out above, was treated by maintaining it at a temperature of 250° C. under vacuum under a partial pressure of non-ionized molecular oxygen $O_2$ of $2 \times 10^{-4}$ torr (or $2.7 \times 10^{-2}$ Pascals) for 30 minutes. The thus treated film had exactly the same electrical and optical characteristics as the starting film.

Examples 2 and 3 use a beam of oxygen ions generated by an ion gun sold commercially under the tradename Commonwealth Mark II by the Commonwealth Scientific Company. The ion gun emits a beam, the ion density of which measured at 15 cm from the emission source, is approximately 3.3 mA/cm$^2$.

The installation was as follows: the substrate covered with the ITO film was placed in an enclosure under a vacuum of $2 \times 0^{-6}$ torrs (or $2.7 \times 10^{-4}$ Pascals) which was ideally the enclosure in which the deposition of the film was carried out. The substrate was placed vertically on a turntable at approximately 10 cm distance from the starting point of the beam.

Example 2

The ion beam treatment conditions are as follows:
energy of the beam: 60 e.V
ion current density: 3.3 mA/cm$^2$
duration of treatment: 3 minutes
temperature of substrate: approximately 30° C.

At 30° C. and under the strong density of the current, the treated zone of the film did not undergo any variation in resistivity, then began to atomize under the impact of the ions at a mean rate of 10 nm/minute. These results were therefore not suitable, because they did not create the desired effect of modifying the resistivity, and because the film was progressively destroyed as the treatment was continued.

Examples 3 and 4 are Examples according to the present invention.

Example 3

The ion beam treatment conditions are as follows:
energy of beam: 52 e.V
ion current density: 0.4 mA/cm$^2$
duration of treatment: 30 minutes
temperature of substrate: 250° C.

No change in thickness was observed, which indicated that no atomization of the film had taken place.

The film parameters obtained are summarized in Table II below and relate to the treated zone, which is situated at the center of the focusing field of the beam.

TABLE II

| | |
|---|---|
| n | 2 |
| $R_\square$ | 74 |
| $\rho$ | $10.2 \times 10^{-4}$ |
| $R_L$ | 10.5 |
| $\lambda_{dom}$ | 453 |
| $P_e$ | 29 |

Example 4

The treatment conditions were identical to those of Example 3, except in regard to the duration of the ion beam treatment which was now only 6 minutes. The square resistance of the zone situated at the center of the focusing field of the beam was increased to a value of approximately 32 Ohm.

Comparing the results of Examples 1 and 3 on the one hand, and of Examples 2 and 3 on the other hand, it will be seen that in order to obtain a localized variation in conductivity without leading to a variation in thickness, it is necessary to combine the use of an ion beam and maintenance of the film at high temperature during the ion beam treatment.

Accordingly, in Example 1, an attempt to oxidize at high temperature with molecules of $O_2$ did not give any resulting change, while an attempt (Example 2) to compensate by treatment at ambient temperature using an ion beam having a high ion current density only leads to local destruction of the film.

The method of the present invention therefore implies a synergy between heat and reactive ions, which provide the variation in conductivity, possibly by facilitating the restructuring of the film to a sufficient thickness.

If Tables I and II are compared, it will be seen that the resistivity of the treated zones (Example 3) has been multiplied by a factor of 4 when compared with the resistivity of the untreated initial film. The same is true for the square resistance, because the treatment does not modify the thickness of the film. Moreover, from the comparison of Examples 3 and 4 according to this invention, it will be seen that it is also possible to obtain a lesser but non-negligible variation in square resistance with a shorter treatment duration, on the order of one minute. It is therefore possible to obtain a range of variations of resistivity between treated and untreated zones, preferably by modulating the treatment time.

In conclusion, the process according to the present invention enables the desired local variations in electrical properties to be achieved, while still preserving the homogeneity of the optical properties. Thus, from Tables I and II, the visual appearances in reflection of the treated and untreated zones have scarcely detectable differences, as shown by the close values of $R_L$ and $P_e$. Similarly, even though the dominant wavelengths appears to be far apart, they are in fact very close together once they are plotted in the locus spectrum, and both correspond to a very similar shade of color.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for generating one or more differentiated zones of electrical conductivity or infrared emissivity in a semi-conducting thin film of metallic oxide or oxides, comprising:
    subjecting said semi-conducting thin film to an oxygen ion beam having sufficient energy to reduce the electrical conductivity or increase the infrared emissivity of said one or more zones without atomizing said semi-conducting thin film, wherein said semi-conducting thin film is at a temperature of at least 150° C. during said subjecting step, and said ion beam has an energy at impact on said semi-conducting thin film of less than 100 electron volts.

2. The method of claim 1, wherein said semi-conducting thin film is polarized during said step of subjecting said semi-conducting thin film to an ion beam.

3. The method of claim 1, wherein said ion beam has an ion current density of from 0.1 to 1.0 mA/cm$^2$.

4. The method of claim 1, wherein said temperature is approximately 250° C.

5. The method of claim 1, wherein said semi-conducting thin film is deposited by a vacuum deposition method.

6. The method of claim 5, wherein said vacuum deposition method is cathodic sputtering assisted by a magnetic field.

7. The method of claim 1, wherein said semi-conducting thin film comprises a substoichiometric or doped metallic oxide film selected from the group consisting of indium oxide doped with tin (ITO), zinc oxide doped with indium (ZnO:In), zinc oxide doped with fluorine (ZnO:F), zinc oxide doped with aluminum (ZnO:Al), zinc oxide doped with tin (ZnO:Sn) and tin oxide doped with fluorine (SnO$_2$:F).

8. A method for preparing a transparent heating pane which has uniform heating of the pane regardless of geometry, wherein said pane comprises one or more semi-conducting thin films of metallic oxide or oxides, comprising:

generating differentiated zones of electrical conductivity or infrared emissivity in said one or more semi-conducting thin films of metallic oxide or oxides, by subjecting said one or more semi-conducting thin films to an oxygen ion beam having sufficient energy to reduce the electrical conductivity or increase the infrared emissivity of said one or more zones without atomizing said zones, wherein said one or more semi-conducting thin-films is at a temperature of at least 150° C. during said subjecting step, and said ion beam has an energy at impact on said semi-conducting thin film of less than 100 eV.

* * * * *